June 24, 1930. W. FERGUSON 1,767,659
SHEET METAL BUMPING-OUT TOOL
Filed May 4, 1928 6 Sheets-Sheet 1

INVENTOR.
William Ferguson,
BY Geo. P. Kimmel
ATTORNEY.

INVENTOR.
William Ferguson,
BY Geo. P. Kimmel
ATTORNEY.

Patented June 24, 1930

1,767,659

UNITED STATES PATENT OFFICE

WILLIAM FERGUSON, OF FLINT, MICHIGAN

SHEET-METAL BUMPING-OUT TOOL

Application filed May 4, 1928. Serial No. 275,218.

This invention relates to tools to be used for metal bumping work, more particularly for use in bumping out indentations in automobile bodies due to collisions and accidents, and the invention has for its object to provide a tool of such class, in a manner as hereinafter set forth for reaching a certain part of an automobile body without the necessity of tearing down the inner frame or supporting structure to get at the indentation in the metal for the purpose of bumping it out.

Further objects of the invention are to provide a bumping-out tool or group of such tools designed for use in removing indentations from various portions of an automobile body.

It has been the practice heretofore in removing indentations from the sheet metal structure of an automobile to place a dolly or bumping-out block against one face of the work to be bumped out while blows are delivered by a hammer to the opposite face of the work. It frequently happens however that access to the inner face of the sheet metal structure of an automobile is obstructed by beams, braces and backing structure, so that such obstructing structure must be removed before a dolly can be placed against the work to be bumped out.

The present invention therefore relates to a bumping-out tool or group of bumping-out tools having a handle and a blade-like anvil disposed at an angle to the handle and constructed so that the anvil may be inserted between the inner face of an indented portion of an automobile and the adjacent supporting structure to back up the indented metal during the bumping-out operation. The anvils are disposed at various angles to the handles to facilitate the use of the tools in different bumping out operations, and the outer face of the anvils are curved to conform more or less accurately to the surface of the work being bumped out.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views.

The form of tool shown in Figures 1 to 7, both inclusive, is termed a long handle wheel house spoon and comprises a handle 25 of appropriate length and preferably of polygonal cross section to facilitate holding the handle firmly in the hand. One end of the handle 25 merges into a curved coupling portion or extension 26 which terminates in a curved anvil 27. The portion 26 is angularly disposed with respect to the handle 25. The anvil 27 is disposed at an angle and reversely curved with respect to the curvature of the portion 26. The anvil 27 extends in a direction towards and is disposed at an inclination with respect to the line of the handle 25. The anvil 27 gradually increases in width from its inner toward its outer end. The anvil 27 further gradually decreases in thickness from its inner toward its outer end and the rear face of the anvil 27 is of arcuate curvature transversely. The forward face of the anvil 27, in cross section is squared.

The form of tool shown in Figures 8 to 13, both inclusive, is what is termed an upper back panel spoon and it includes a handle 28 of appropriate length and of polygonal cross section and which terminates in an angularly disposed curved coupling portion or extension 29 and the latter terminates in a curved anvil 30 which is reversely curved and angularly disposed with respect to the portion 29. The anvil 30 extends towards and is disposed at an inclination with respect to the line of the handle 28. The anvil 30 is of greater length than the anvil 27 and is not disposed at as great an inclination as the anvil 27. The anvil 30 gradually decreases in thickness from its inner toward its outer end, but the thickness of the anvil 30 is less throughout than the thickness of the anvil 27. The anvil 30 slightly increases in width from its inner to its outer end whereby said anvil 30 will be tapered but the taper thereof is materially less than the taper of the anvil 27. The rear face of the anvil 30 is of arcuate contour transversely. The anvil 30 is disposed and curved in a manner whereby the free end thereof will not project beyond the line of the handle 28, whereas the anvil 27 is such whereby its free end will project beyond the line of the handle 25.

Figures 1, 2, 5, 6:
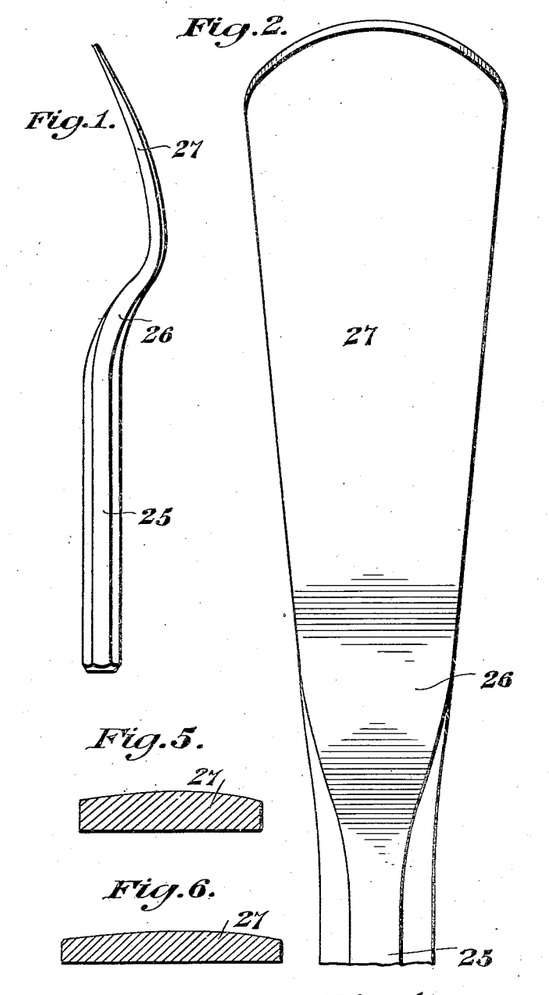
Figure 1 is a side elevation of a tool in accordance with this invention for bumping out metal.
Figure 2 is a fragmentary view, upon an enlarged scale in front elevation of the tool.
Figures 5, 6, and 7 are respectively sections taken on lines 5—5, 6—6 and 7—7 of Figure 3.
Figure 3:
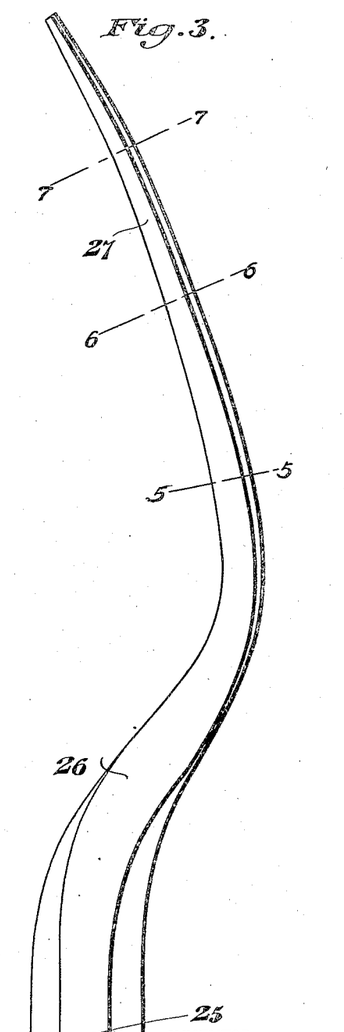
Figure 3 is a fragmentary view in side elevation and upon an enlarged scale of the tool.
Figure 4:
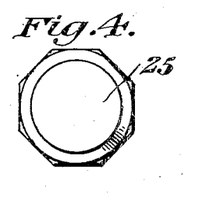
Figure 4 is an end view looking towards the free end of the handle of the tool.
Figure 7:
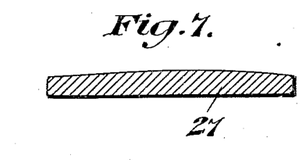
Figure 8:
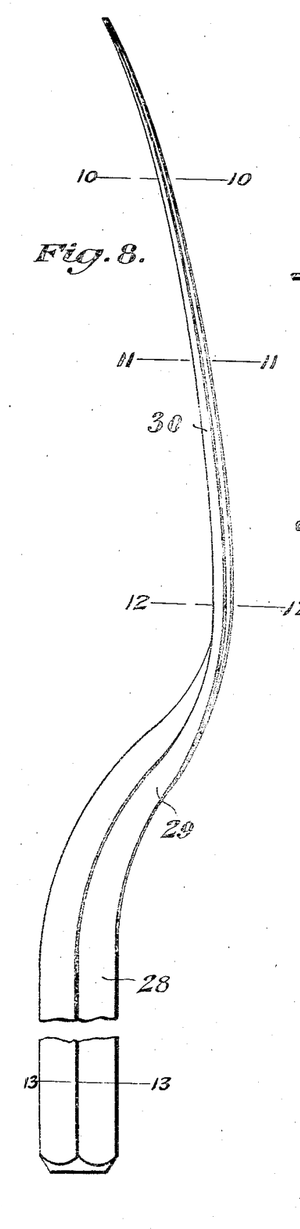
Figure 8 is a side elevation broken away of another form of tool in accordance with this invention for bumping out metal.
Figures 9, 10, 11, 12, 13:
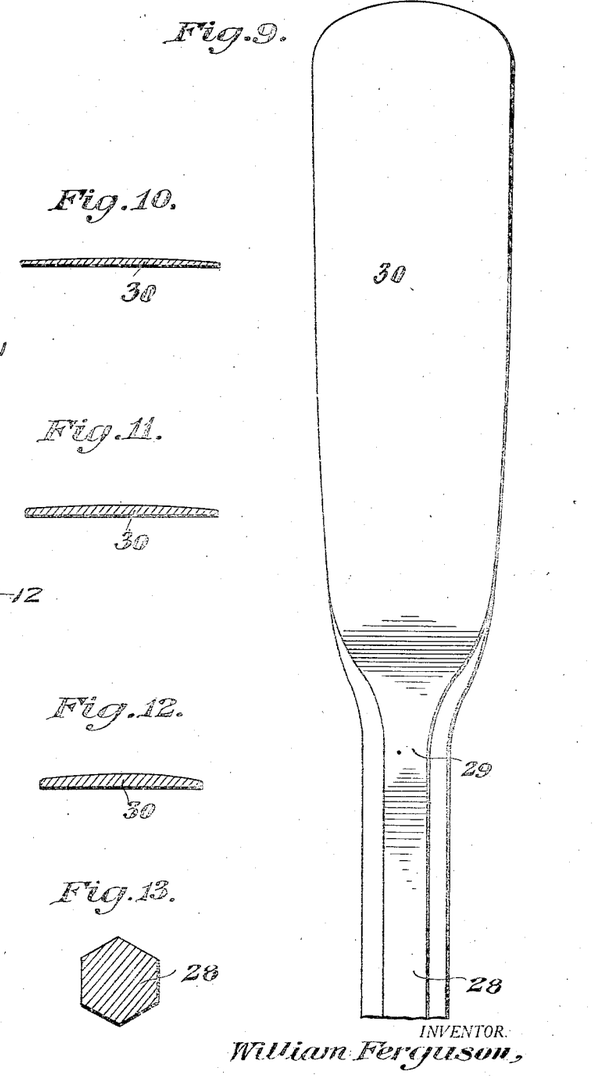
Figure 9 is a fragmentary view in front elevation of the tool.
Figures 10, 11, 12 and 13 are respectively sections taken on lines 10—10, 11—11, 12—12 and 13—13 of Figure 8.
Figures 14, 15, 16:
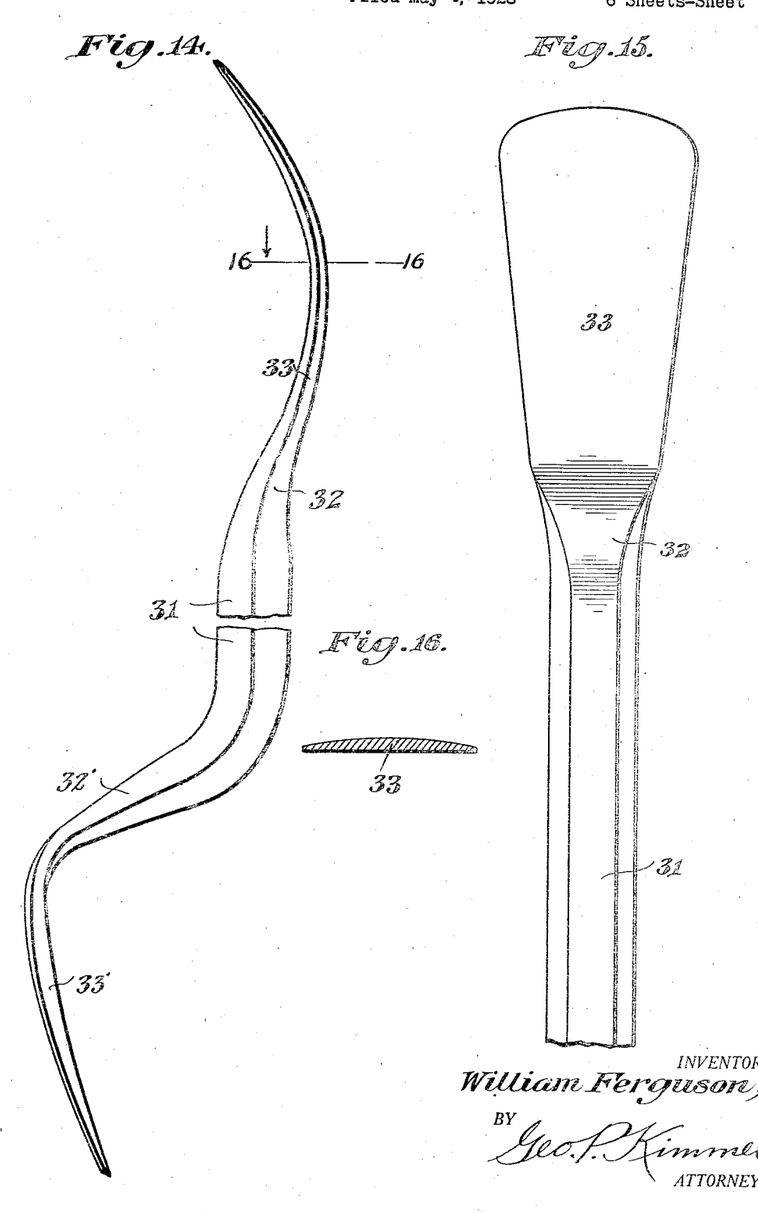
Figure 14 is a side elevation, broken away, of another form of tool in accordance with this invention for bumping out metal.
Figure 15 is a fragmentary view in front elevation of the tool shown in Figure 14.
Figure 16 is a section on line 16—16 of Figure 14.
Figures 17, 19, 20:
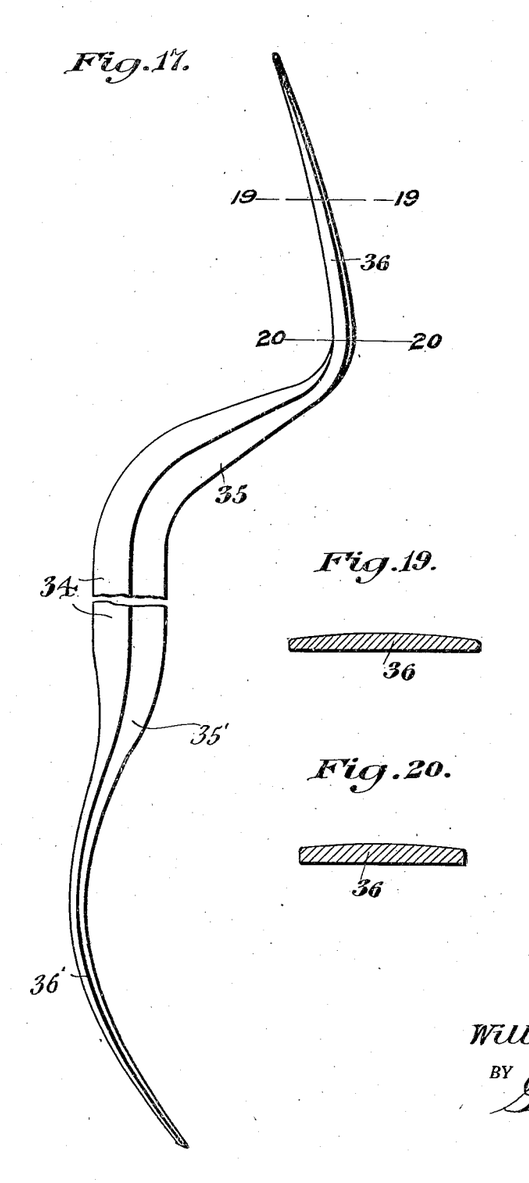
Figure 17 is a side elevation, broken away, of another form of tool in accordance with this invention for bumping out metal.
Figures 19 and 20 are respectively sections taken on lines 19—19 and 20—20 of Figure 17.
Figure 18:
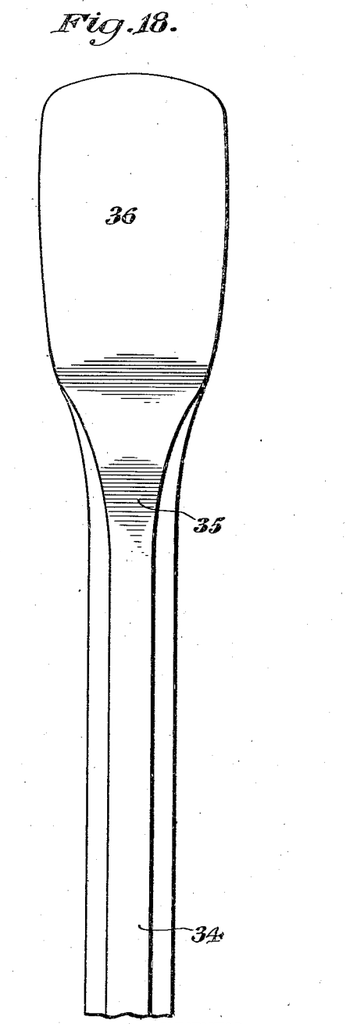
Figure 18 is a fragmentary view in front elevation of the form of tool shown in Figure 17.
Figures 21, 23:
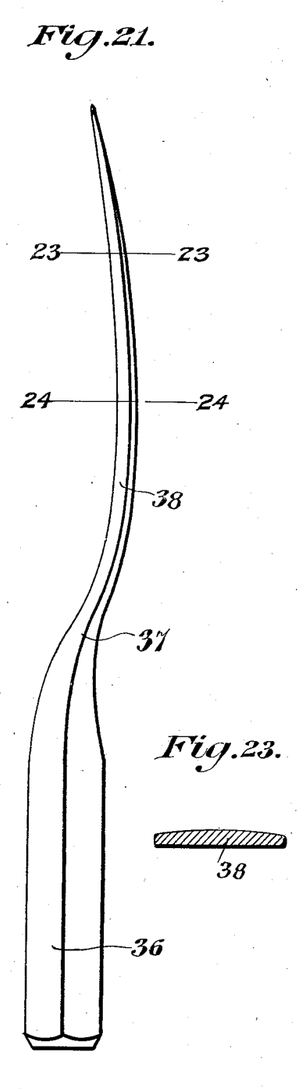
Figure 21 is a side elevation of still another form of tool in accordance with this invention for bumping out metal.
Figures 23 and 24 respectively are sections taken on lines 23—23 and 24—24 of Figure 21.
Figure 22:
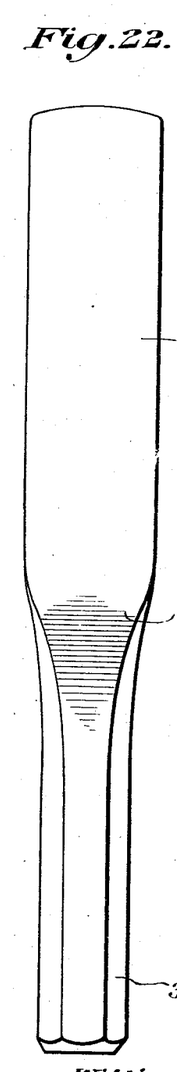
Figure 22 is a front elevation of the form of tool shown in Figure 21.
Figure 24:
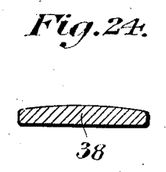
Figure 25:
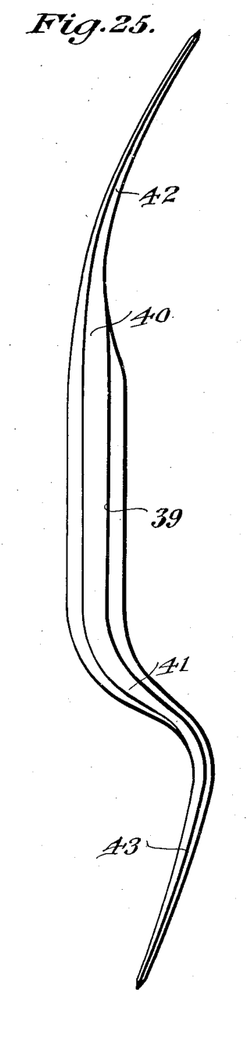
Figure 25 is a side elevation of still another modified form of tool, in accordance with this invention for bumping out metal.
Figure 26:
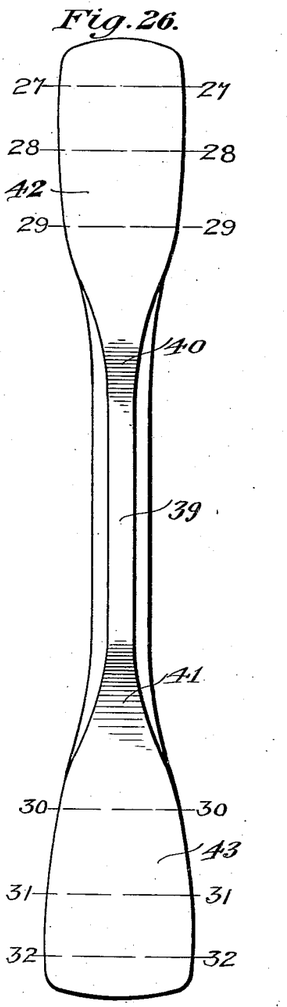
Figure 26 is a rear elevation of the form of tool shown in Figure 25.
Figure 27:
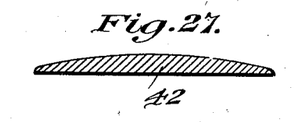
Figures 27 to 32 both inclusive are sections upon lines 27—27, 28—28, 29—29, 30—30, 31—31 and 32—32 respectively, of Figure 26.
Figure 28:
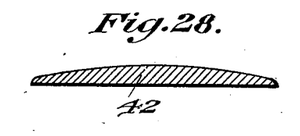
Figure 29:
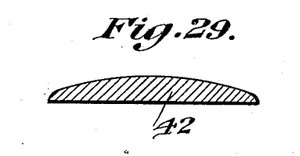
Figure 30:
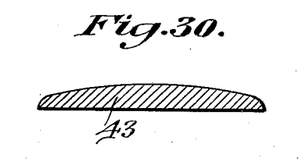
Figure 31:
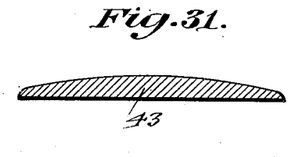
Figure 32:
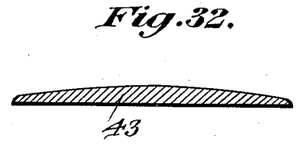

The tool as shown in Figures 14 to 16, both inclusive, is what is termed a double end upper back panel spoon and it includes a handle 31 of the desired length and of polygonal cross section. The handle 31 merges at one end into a tapered coupling portion 32 which is slightly curved, but the curvature thereof is not as great as the curvature of the coupling portions 26 and 29 referred to in connection with Figures 2 and 8. The portion 32 at its outer end is inclined slightly away from and with respect to handle 31 and merges into an anvil 33 having its curvature greater than the curvature of the anvils 27 and 30. The anvil 33 is not disposed at an inclination but the curvature is such that the free end thereof will project slightly beyond the line of the handle 31. The other end of handle 31 terminates into a slightly curved tapered coupling portion or extension 32′ which extends in an opposite direction with respect to the portion 32 and inclines away from the handle 31. The portion 32′ is of greater length than portion 32 and merges into a curved anvil 33′ disposed at an angle with respect to portion 32′ and extending in a direction opposite to that in which the anvil 33 extends. The anvil 33′ extends towards the line of the handle 31, but its free end does not reach the line of the handle 31. The free end of anvil 33 is positioned at a point between the free end of anvil 33′ and the line of the handle 31.

The anvils 33, 33′ are of less thickness than the anvil 27 and slightly decrease in thickness from their inner to their outer ends. The rear face of the anvil 33 is of arcuate curvature transversely and the forward face of anvil 33′ is of arcuate curvature transversely. The anvils 33, 33′ gradually increase in width from their inner to their outer ends. The body of anvil 33′ is constructed similar to that of anvil 33, but oppositely disposed with respect thereto.

The anvil 33 is of arcuate curvature transversely. The anvil 33 gradually increases in width from its inner to its outer end, thereby providing the anvil of tapered form, but the taper thereof is not as great as the taper of the anvil 27, but is greater than the taper of the anvil 30. The anvil 33 is of less length than the anvil 27 or the anvil 30.

The form of tool shown in Figures 17 to 20, is what is termed a double end upper back panel spoon and it includes a handle 34 of appropriate length and of polygonal cross section. The handle 34 terminates at one end into an angularly disposed coupling portion or extension 35 which inclines away from the handle, tapers towards its outer end and merges into an anvil 36 extending in a direction opposite to that of portion 35 and towards the line of the handle 34. The anvil 36 is disposed at an inclination with respect to and is upon a slight curve projecting outwardly from the portion 35. The anvil 36 gradually decreases in thickness from its inner toward its outer end and the rear face of the anvil 36 is of arcuate curvature transversely. The anvil 36 is of substantially oval contour and it very slightly increases in width from its inner toward its outer end and has the corners thereof rounded. The anvil 36 is reversely bent with respect to the extension 35 and extends towards the line of the handle 34 but does not project beyond the line of the handle.

The handle 34 at its other end terminates in a tapered coupling portion or extension 35′ disposed lengthwise with respect to the length of the handle and which merges into an anvil 36′ of greater curvature and length than that of anvil 36. The anvil 36′ is reversely curved with respect to anvil 36 and has its free end projecting beyond the line of the handle 34, but is positioned slightly forwardly with respect to the free end of the anvil 36. The anvil 36′ is oppositely disposed with respect to the anvil 36, and otherwise than that as stated the anvil 36′ is constructed similar to anvil 36.

The form of tool shown in Figures 21 to 24, is what is termed a hinge spoon and it comprises a handle 36 of appropriate length and of polygonal cross section. One end of the handle 36 terminates into an angularly disposed, tapered coupling portion or extension 37, which merges into a curved anvil 38.

The anvil 38 gradually increases in thickness from its outer to its inner end and has its rear face of arcuate curvature. The anvil 38 is of the same width throughout. In cross section the forward face of the anvil 38 is squared. The extension 37 is upon a slight curve and the anvil 38 extends upon a curve reverse with respect to the curvature of the extension 37.

The free end of the anvil 38 does not project beyond the line of the handle 36.

The form of tool shown in Figures 25 to 32 is what is termed a double end lower back panel spoon and includes a handle 39 of polygonal cross section provided at one end with a tapered coupling portion or extension 40 disposed lengthwise with respect to the length of the handle, and the latter is provided at its other end with an angularly disposed, tapered coupling portion or extension 41. The extension 40 merges into an anvil 42 which is upon a slight curve and projects away from the line of the handle at a slight inclination with respect thereto. The anvil 42 gradually decreases in thickness from its inner to its outer end and has its forward face of arcuate curvature transversely. The anvil 42 lengthwise is of substantially oval form, but increases in width from its inner to its outer end.

The extension 41 inclines away from the handle 39 and merges into an anvil 43 disposed upon a slight inclination to the extension 41 and with the free end thereof positioned to one side of the line of the handle 39. The anvil 43 projects towards the line of the handle 39, and the anvil is also upon a slight curve and of greater width than anvil 42. The rear face of anvil 43 is of arcuate curvature transversely. Anvil 43 is of greater thickness than anvil 42, and gradually decreases in thickness from its inner to its outer end. Anvil 43 is of slightly less length than anvil 42 and gradually increases in width from its inner to its outer end. Otherwise than that as stated anvil 43 is constructed similar to anvil 42 but oppositely disposed with respect thereto.

It will be seen from the foregoing that each of the bumping-out tools shown and described consists of a relatively heavy handle adapted to be held in the hand during the bumping operation and a curved blade-like anvil having a convex outer surface adapted to be held against the work to be bumped out. The anvils of the different tools are offset from the handles to different degrees and the anvils are inclined to the handle to a greater degree in some tools than others. The tools are carefully designed to facilitate the bumping out indentations in different portions of an automobile body without the necessity of tearing down the inner supporting structure, and the handle of each tool is sufficiently heavy to cause its weight or inertia of rest to resist the blows of the bumping-out hammer.

What I claim is:

1. A metal bumping out tool comprising a handle, an extension projecting therefrom, and an anvil integral with the outer end of the extension, disposed from its inner to its outer end upon a curve, projecting from its inner to its outer end towards the line of the handle, gradually decreasing in thickness from its inner to its outer end, having one face of arcuate curvature transversely and its other face plane in transverse section at any point throughout.

2. A metal bumping out tool comprising a handle, an extension projecting therefrom, and an anvil integral with the outer end of the extension, disposed from its inner to its outer end upon a curve, projecting from its inner to its outer end towards the line of the handle, gradually decreasing in thickness from its inner to its outer end, having one face of arcuate curvature transversely and its other face plane in transverse section at any point throughout, and said extension being reversely curved with respect to the anvil.

3. A metal bumping out tool comprising a handle, an extension projecting therefrom, an anvil integral with the outer end of the extension, disposed from its inner to its outer end upon a curve, projecting from its inner to its outer end towards the line of the handle, gradually decreasing in thickness from its inner to its outer end, having one face of arcuate curvature transversely and its other face plane in transverse section at any point throughout, and said anvil further gradually increasing in width from its inner toward its outer end.

4. A metal bumping out tool comprising a handle, an extension projecting therefrom, and an anvil integral with the outer end of the extension, disposed from its inner to its outer end upon a curve, projecting from its inner to its outer end towards the line of the handle, gradually decreasing in thickness from its inner to its outer end, having one face of arcuate curvature transversely and its other face plane in transverse section at any point throughout, and said extension being tapered and angularly disposed with respect to the handle.

5. A metal bumping out tool comprising a handle, an extension projecting therefrom, an anvil integral with the outer end of the extension, disposed from its inner to its outer end upon a curve, projecting from its inner to its outer end towards the line of the handle, gradually decreasing in thickness from its inner to its outer end, having one face of arcuate curvature transversely and its other face plane in transverse section at any point throughout, said anvil further gradually increasing in width from its inner toward its outer end, and said extension being tapered and angularly disposed with respect to the handle.

6. A metal bumping out tool comprising a handle, an extension projecting therefrom, and an anvil integral with the outer end of the extension, disposed from its inner to its outer end upon a curve, projecting from its inner to its outer end towards the line of the handle, gradually decreasing in thickness from its inner to its outer end, having one face of arcuate curvature transversely, and the anvil being reversely bent with respect to said extension.

7. A metal bumping tool comprising a handle, tapered extensions at the ends thereof, said extensions projecting in opposite directions with respect to the line of the handle, and anvils projecting from the extensions and each curving in the direction of its length, each of said anvils having one of its faces of arcuate curvature transversely and gradually increasing in width and decreasing in thickness from its inner towards its outer end, and one of the anvils being arranged to extend from its inner to its outer end toward the line of the handle.

8. A metal bumping tool comprising a handle, tapered extensions at the ends thereof, said extensions projecting in opposite directions with respect to the line of the handle, and anvils projecting from the extensions and each curving in the direction of its length, each of said anvils having one of its faces of arcuate curvature transversely and gradually increasing in width and decreasing in thickness from its inner towards its outer end, the anvil carried by one extension having its outer end portion projecting away from the line of the handle and the anvil carried by the other extension projecting towards the line of the handle.

9. A metal bumping tool comprising a handle, an angularly disposed extension projecting from one end thereof, said extension being curved, and a lengthwise curved anvil projecting from the extension towards the line of the handle and having one face of arcuate curvature transversely and its other face plane in transverse section, a portion of said anvil being offset with respect to the handle, said anvil at its point of mergence with the extension being of the same width as that of the latter, and said anvil gradually increasing in width from its inner to its outer end.

10. A metal bumping tool comprising a handle, a tapered extension at one end thereof, and a lengthwise curved anvil projecting from the extension, projecting in a direction towards the line of the handle and outwardly from the extension and gradually decreasing in thickness from its inner to its outer end, said anvil disposed lengthwise with respect to the handle and having one face of arcuate curvature transversely and its other face plane.

11. A metal bumping out tool comprising a handle, an extension projecting from one end thereof at an obtuse angle, and a curved anvil projecting outwardly from said extension at an inclination towards the line of the handle and having one of its faces plane.

12. A metal bumping out tool comprising a handle, an extension projecting from one end thereof at an obtuse angle, and a curved anvil projecting outwardly from said extension at an inclination towards the line of the handle, said anvil gradually increasing in width from its inner to its outer end and having one face of arcuate curvature transversely and its other face plane in transverse section at any point throughout.

13. A bumping-out tool for removing indentations in the metal structure of a vehicle, comprising a relatively heavy bar-like handle, a longitudinally curved blade-like anvil at each end of the handle and one anvil being offset from the longitudinal axis of the handle and extending from its inner to its outer end towards said axis, and the other anvil being disposed at an acute angle to said axis.

14. A bumping-out tool for removing indentations in the metal structure of a vehicle, comprising a bar-like handle, a longitudinally curved blade-like anvil at one end of the handle and offset from the longitudinal axis of the handle and extending from its inner to its outer end towards said axis.

In testimony whereof, I affix my signature hereto.

WILLIAM FERGUSON.